Figure 1:
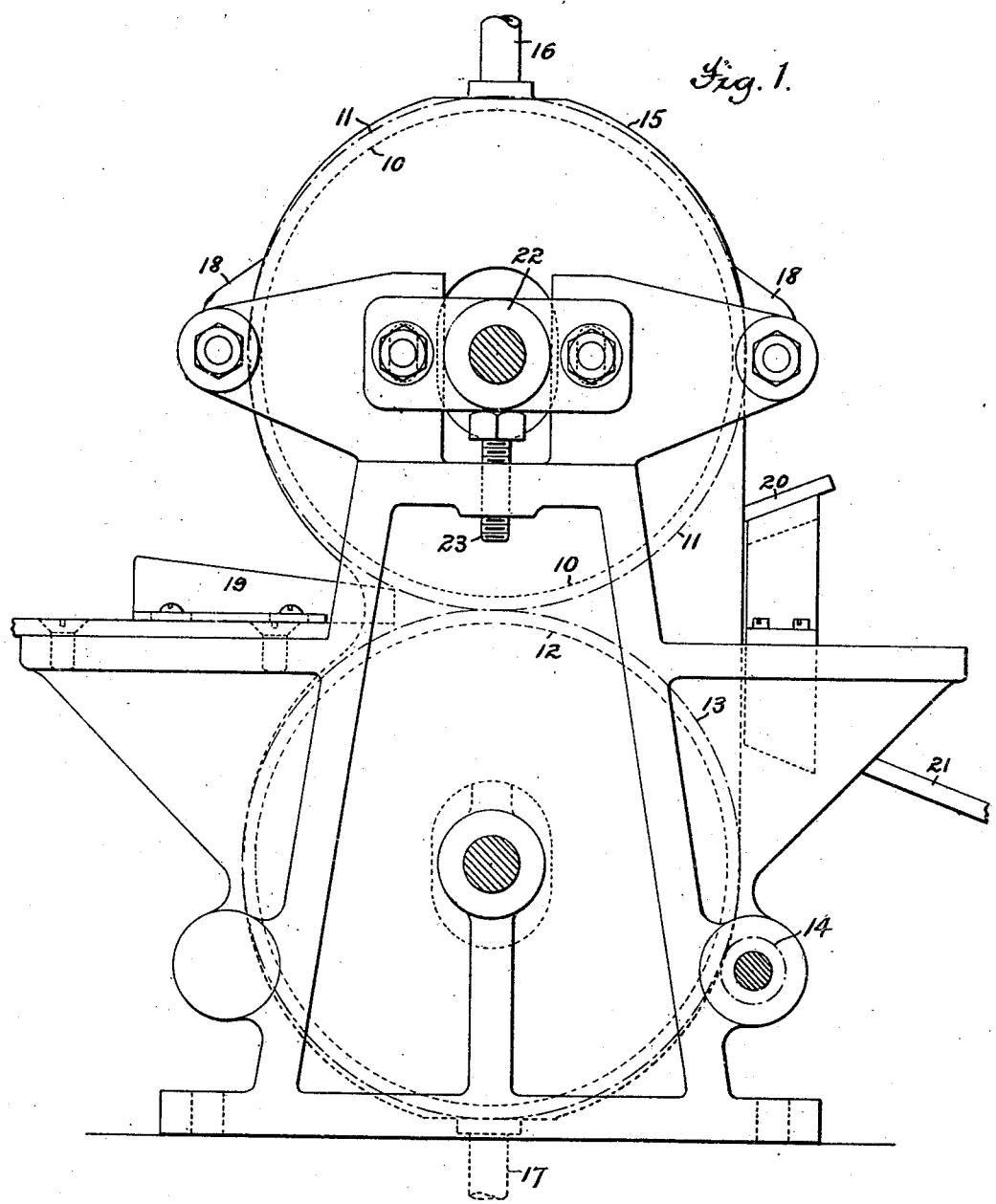

H. MAXIM.
MACHINE FOR PERFORATING AND FORMING CELLULAR POWDER GRAINS.
APPLICATION FILED MAR. 29, 1905.

946,943.

Patented Jan. 18, 1910.
5 SHEETS—SHEET 1.

WITNESSES:

INVENTOR
Hudson Maxim,
BY
Mauro, Cameron, Lewis & Massie,
ATTORNEYS

H. MAXIM.
MACHINE FOR PERFORATING AND FORMING CELLULAR POWDER GRAINS.
APPLICATION FILED MAR. 29, 1905.
946,943.
Patented Jan. 18, 1910.
5 SHEETS—SHEET 2.
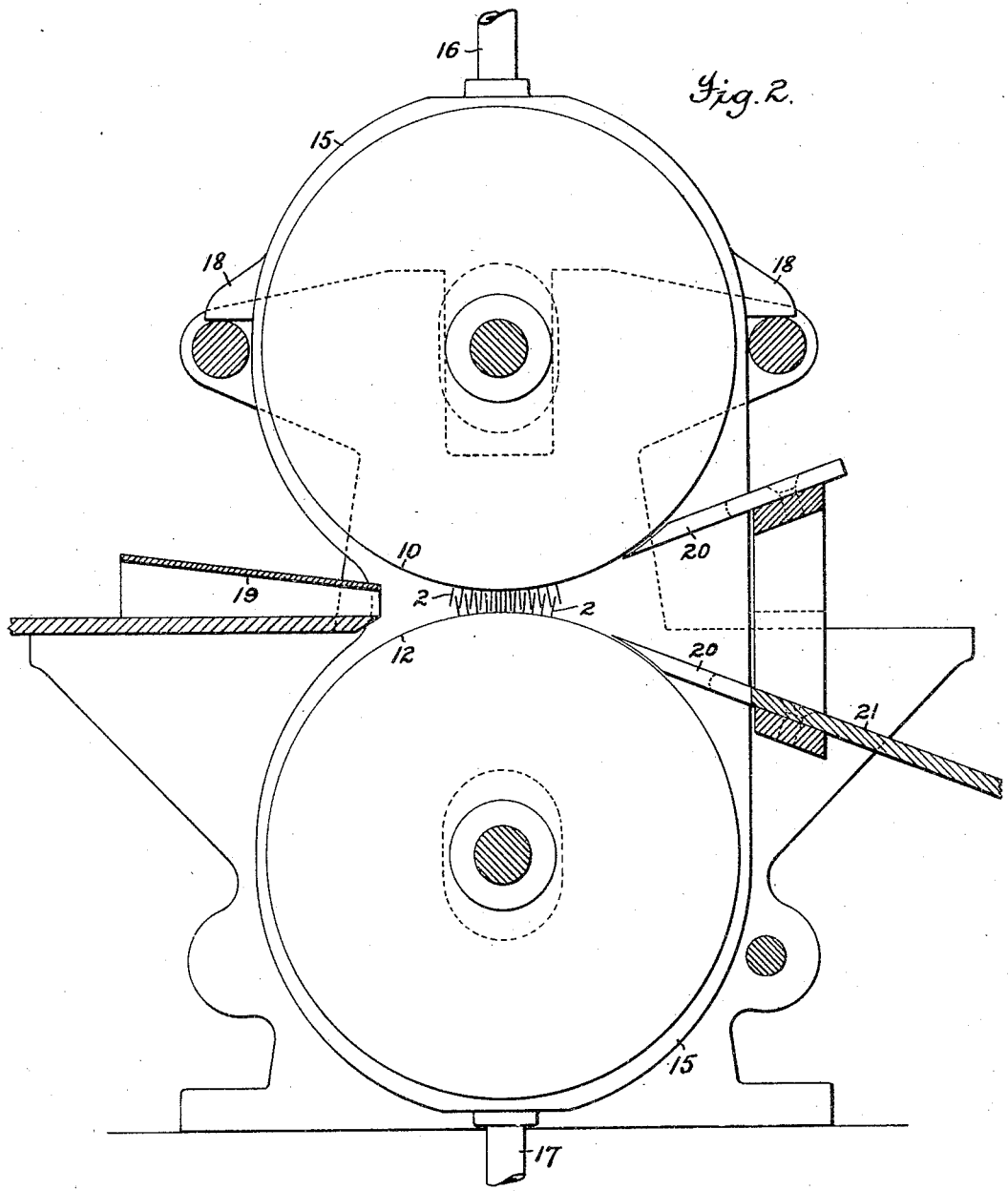

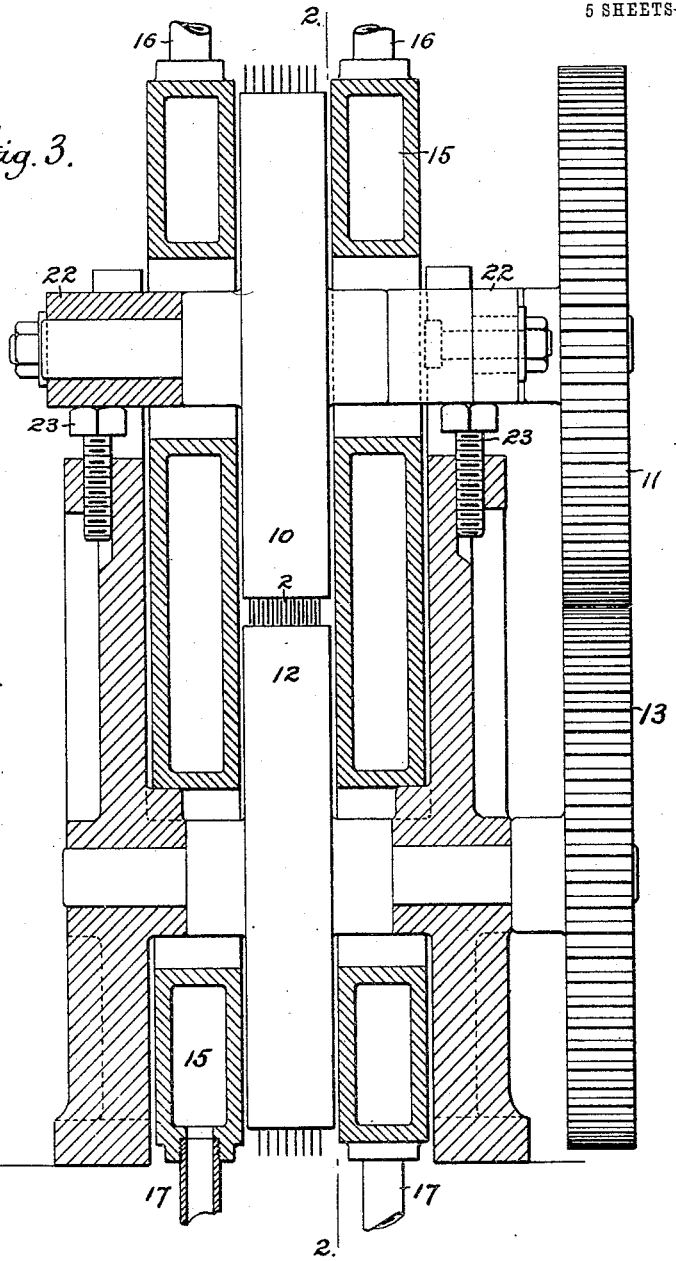

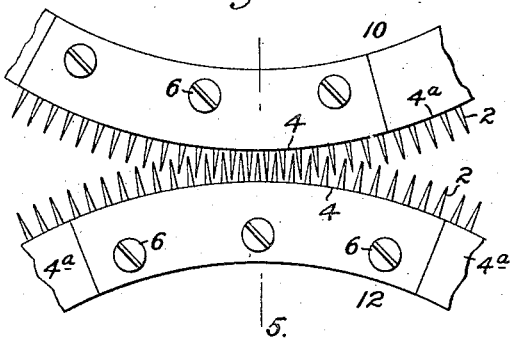
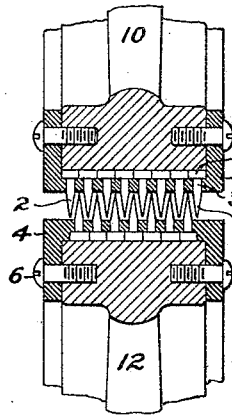
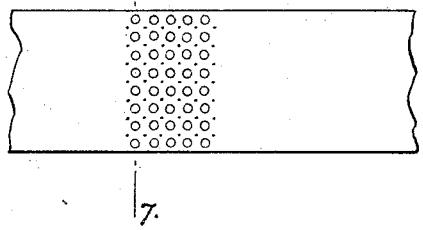
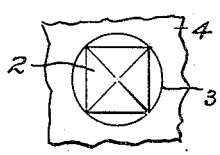
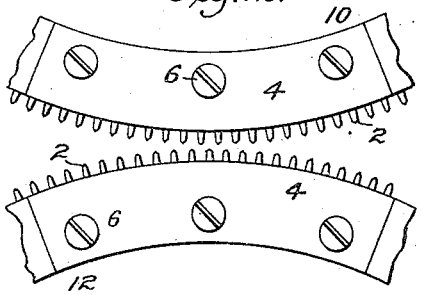
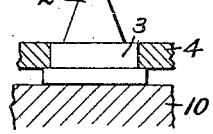

H. MAXIM.
MACHINE FOR PERFORATING AND FORMING CELLULAR POWDER GRAINS.
APPLICATION FILED MAR. 29, 1905.
946,943.
Patented Jan. 18, 1910.
5 SHEETS—SHEET 5.
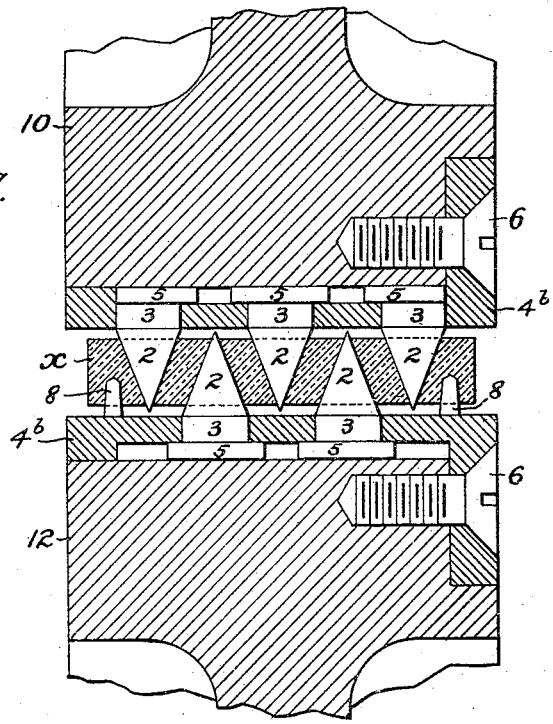
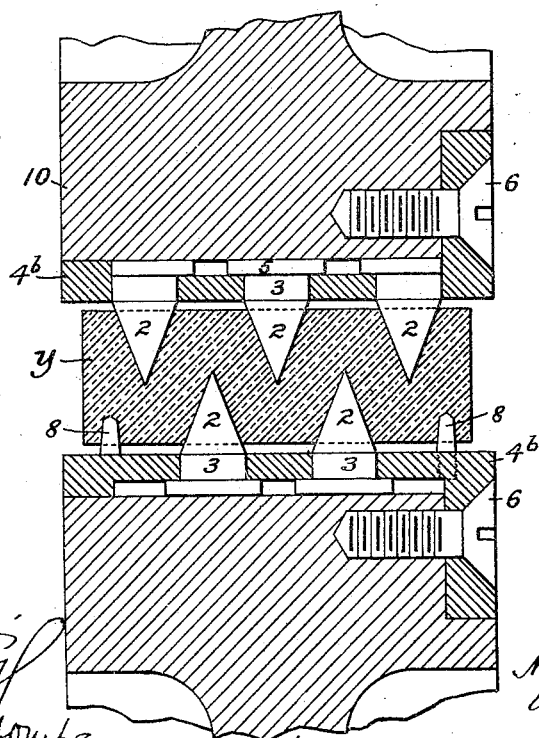

UNITED STATES PATENT OFFICE.

HUDSON MAXIM, OF NEW YORK, N. Y.

MACHINE FOR PERFORATING AND FORMING CELLULAR POWDER-GRAINS.

946,943.  Specification of Letters Patent.  Patented Jan. 18, 1910.

Application filed March 29, 1905. Serial No. 252,785.

*To all whom it may concern:*

Be it known that I, HUDSON MAXIM, of the borough of Brooklyn, city of New York, State of New York, have invented a new and useful Improvement in Machines for Perforating and Forming Cellular Powder-Grains, which invention is fully set forth in the following specification.

This invention relates to machines for perforating or forming cellular powder grains, more especially those made of an amorphous colloid and known as smokeless powder.

The object of the invention is to provide a machine that will produce powder grains somewhat less dense per unit of volume than such grains are when of simple, plain, non-cellular or unperforated flat strips so that the charge may be better distributed in the powder chamber of the gun, and which powder grains shall be consumed in the gun with a considerable degree of acceleration— that is to say, the burning surfaces of which shall increase instead of decreasing as the grains are consumed, or at least remain constant and not decrease.

Furthermore, it has for its object to adapt a machine to operate on different thicknesses of powder grains so that the cells will vary in depth, or the width or thickness of the web or wall of powder between the cells or perforations be uniformly changed in proportion as the thickness of the grain is changed to adapt it for use in larger or smaller guns.

In practice the material is rolled into sheets of the required thickness for a gun of a given size of caliber. These sheets are then preferably cut into long, plain strips of a definite and equal width, which are fed between a pair of pin-carrying rolls, which impress their pins into or through the powder strips or grains thereby forming a cellular structure of considerably less density than unperforated powder grains. The perforating or cell-forming pins may extend either entirely through the thickness of the grains, from surface to surface, or only more or less partially through the thickness from the opposite surfaces thereof, according as the perforating or cellulating rolls are adjusted either with their peripheries as close together as the pins will permit or separated so that the pins will extend from the opposite surfaces only a portion of the way through into the thickness of the powder, and in either case leaving a web of powder between the perforations or cells of uniform thickness and contour, and at the same time proportioned to the thickness of the grains.

The accompanying drawings illustrate a practical embodiment of the invention, in which:

Figure 1, is a side elevation of the improved machine, the intermeshing toothed wheels being removed and their pitch diameters indicated by dotted lines. Fig. 2, is a vertical longitudinal section of the same on the line 2, 2 of Fig. 3. Fig. 3 is a vertical cross section. Fig. 4 is an enlarged elevation of the contiguous portions of the two perforating or cellulating rolls. Fig. 5 is a view partly in elevation and partly in cross section of the same on the line 5 of Fig. 4. Fig. 6, is an elevation of a powder grain partially perforated; and Fig. 7 is a cross-section of the same on the line 7 of Fig. 6. Figs. 8 and 9 are enlarged cross sections of a modified form of the perforating wheels, adjusted at different distances apart, and showing the cell-forming pins embedded in powder grains of different widths. Figs. 10 and 11 are respectively plan and sectional elevations of a rectangular tapered pin. Fig. 12, is an elevation of a portion of a pair of perforating rolls, showing a further modified form of pin; and Fig. 13, is a cross section of a powder grain produced by the wheels, shown in Fig. 12. Fig. 14, is a sectional detail of a means for adjusting the effective width of the gear teeth of one of the toothed wheels.

The improvements are illustrated in a machine adapted to operate upon flat rectangular strips of powder, known as powder grains, and perforate them or impart to them a cellular structure, as indicated in Figs. 6, 7 and 13, the cells whereof are shaped and arranged to lessen the density of the grains and to obtain a more or less perfect accelerated combustion thereof.

The improved machine consists of a pair of cylindrical rolls, 10, 12, preferably mounted one over the other and to turn in bearings provided by the side frames. The shafts of the rolls have intermeshing toothed wheels, 11, 13, by which they are rotated in unison. The rolls are driven by a pinion 14, meshing with one of said wheels, which pinion may be rotated by hand or other power applied to its shaft.

The rolls are each provided with and carry suitably shaped radially extending pins 2, arranged entirely around the circumference of the rolls, the pins of one roll passing the pins of the other roll and staggered in relation thereto and are partially indicated in diagrams in Figs. 2 and 3, in elevation in Fig. 4 and in cross section in Figs. 5, 8 and 9.

The pins 2 are preferably round tapers, tapering to a point and secured in any suitable manner to the rolls. In the present instance the pins are removably secured to the periphery of the rolls, for which purpose they have straight round shanks 3 fitting holes in a supporting shell 4 and are formed with heads 5 arranged beneath the shell and confined between it and the circumferential surface of the roll proper, as is seen in Figs. 5, 8 and 9. The pins, however, may be of rectangular tapers as in Figs. 10 and 11, or may be blunt pointed tapers as in Fig. 12, or of any other desired contour. I have shown by way of illustration the pins carried on cylindrical or curved surfaces, yet it is apparent that the pins may be supported on other surfaces and secure in part or whole the advantages of this invention.

The supporting shell for each roll may be made in sections 4, 4ª, Fig. 4, of U-shape in cross section, the legs of which embrace the opposite sides of the roll and secured thereto by screws 6. Or, as in Figs. 8 and 9, the shell 4ᵇ may be a complete cylinder fitting over the circumference of the roll and of L-shape in cross section with its single leg secured to one side of the roll by screws 6.

In order to keep the perforating or cellulating pins sufficiently warm to facilitate their embedding the powder grains, and to impart their contour thereto, the rolls may rotate in proximity to heated surfaces provided by fixed hollow walls or tanks 15, located one on each vertical side of the rolls and through which a circulation of hot water or steam passes by suitable supply and eduction pipes 16, 17, connected respectively to the top and bottom of the tanks. The tanks are shaped to conform somewhat to the contour of the assembled rolls, have enlarged holes to pass the shafts of the rolls and are formed with lugs 18 to rest on the cross tie-rods of the side-frames.

The entrance side of the perforating or cellulating rolls is provided with a funnel-shaped guide 19, for the proper guiding and centering of the powder grains widthwise of the rolls, being fed between them; and the discharge side of the rolls is provided with stripping fingers 20, to prevent the powder grains following around either of the rolls, and with an inclined shelf 21, for guiding the perforated or cellular grains away from the machine.

In order to adapt the machine to operate on different thicknesses of powder grains, so that the cellular formation imparted thereto shall be of a depth in proportion to the thickness of the grains, as is shown in Figs. 8 and 9, one of the rolls, preferably the upper one, see Figs. 1, 2 and 3, may be mounted in adjustable bearings 22, supported at the proper height by adjustable screws 23, the intermeshing teeth of the toothed wheels 11, 13, being sufficiently long to permit of the rolls being separated within prescribed limits.

To take up the back lash between the teeth of the toothed wheels, due to the separation of the rolls, one of the toothed wheels, say, 13, see Fig. 14, may be composed of two side-by-side portions 13, 13ª, axially adjustable relative to each other to thereby increase the effective thickness of the teeth.

The two toothed wheel portions, as therein constructed, are loose on the shaft, while the latter has secured to it a cross bar 24, the outer ends of which engage bolts 25, each having a pair of eccentrics 7, fitting holes in the wheel portions—an eccentric for each portion—so that by turning the bolts on their axes the portions will be forced axially in opposite directions to the desired extent, and then clamped in place by their engaging nuts. Of course, other modes of adjustment may be employed.

In some instances, as with quite thin powder grains, it may be desirable, owing to the thinness of the grains, to perforate them or make the cellular formation from one surface only of the grains, in which case the pins of one roll may be omitted, the plain periphery roll holding the grains to duty on the cell-forming or perforating pins of the other roll.

The density of the cellular powder grains may also be varied by omitting some of the peripheral pins of either or both rolls; the manner of supporting and holding the pins, rendering it feasible to remove any number of them for such a purpose or to replace worn or broken ones with new pins, or to replace one form of pins for others of another shape.

The general dimensions of the perforating or cellulating pins best suited to the purposes herein described and capable of proportionally perforating or cellulating powder grains of different thicknesses are best illustrated in Figs. 8 and 9, wherein the heights or lengths of the operative portion of the pins are approximately one-fourth longer than their diameters at their bases, with a space equal to such diameter between the bases of contiguous pins. Assuming the grains $x$ and $y$ to be respectively of the minimum and maximum thickness, by adjusting the rolls 10, 12, intermediate of the extreme adjustments shown, powder grains intermediate in thickness to those shown may be proportionately and properly perforated or made cellular.

Where the width of the powder grains would otherwise necessitate leaving an unduly wide portion unperforated and contiguous with the longitudinal edges of the grain, the roll or rolls may carry an additional row or rows of smaller pins 8, Figs. 8 and 9, to provide the needed cellular structure along such edges.

What I claim is:—

1. In a powder perforating or cellulating machine, the combination of oppositely disposed powder perforating rolls provided with intermeshing drive gears, each of said rolls having a plurality of conical projections for perforating or cellulating plastic powder grains, the projections on one roll being out of alinement with those on the opposite roll while in perforating position, and means for adjusting the distance between said rolls to uniformly vary the web thickness between the adjacent cells of the cellular powder grains.

2. In a powder perforating or cellulating machine, the combination of two oppositely disposed coacting surfaces, a plurality of conical powder perforating or cellulating pins on each of said surfaces the pins on one surface being out of alinement with those on the opposite surface, and means for adjusting one surface relatively to the other to uniformly vary the web thickness between the adjacent cells of the cellular powder grain.

3. In a powder perforating or cellulating machine, the combination of a pair of co-acting rolls having peripheral or cellulating pins, intermeshing toothed wheels carried by said rolls, means for varying the distance between the peripheries of the rolls, one of said toothed wheels having two-part teeth, and means for adjusting the same to compensate for varying the distance between said rolls.

4. In a powder perforating or cellulating machine, the combination of a pair of co-acting adjustable rolls having perforating or cellulating pins, intermeshing toothed wheels carried by said rolls, one of said wheels having two-part teeth, and means for adjusting the same to compensate for varying the distance between the said rolls.

5. In a powder perforating or cellulating machine, a pair of co-acting rolls having peripheral or cellulating pins, and heating means separate from the rolls and in proximity thereto for heating said pins.

6. In a powder perforating machine a pair of co-acting rolls having peripheral perforating or cellulating pins, and hollow walls on the opposite ends of the rolls and means for supplying a heating medium to said wall.

7. A perforating or cellulating roll, peripheral pins having heads resting on the periphery of the roll and a perforated shell engaging the shanks of the pins and having a side flange for securing the same to the roll.

8. A perforating or cellulating roll, a removable cylindrical and perforating shell surrounding the periphery of said roll and removable pins supported by the perforated shell with their inner ends bearing against said periphery, said shell having a side flange for securing the same to the roll.

9. In a powder perforating or cellulating machine a pair of co-acting rolls having peripheral perforating or cellulating pins, means for varying the distance between the rolls, intermeshing gearing connecting the two rolls, and means for varying the effective width of the teeth of one of said gears.

10. In a powder perforating or cellulating machine the hereindescribed roll, having perforating or cellulating pins, tapered lengthwise and of a length slightly longer than the greatest diameter and spaced a distance apart equal to said diameter.

11. In a powder perforating or cellulating machine, the combination of a pair of co-acting adjustable rolls having tapered removable perforating pins, one of said rolls having a marginal row of smaller perforating or cellulating pins for the purpose specified.

12. In a powder perforating or cellulating machine, the combination of a pair of rolls having peripheral perforating or cellulating pins, bearings for said rolls one of said bearings being adjustable relatively to the other, and heating chambers facing the ends of said rolls and having openings for receiving the shafts of said rolls.

13. In a powder perforating or cellulating machine, the combination of a pair of rolls having perforated segmental flanged sectional shells facing the rims of said rolls, powder perforating pins having heads retained by said shell, a guide for directing the powder grains to said rolls, and strippers preventing the perforated material from following said rolls.

14. In a powder perforating machine, a roll having perforating or cellulating pins tapered lengthwise and of a length substantially one-fourth longer than their diameters at their bases, said pins being spaced apart at distances substantially equal to such diameter.

In testimony whereof I have signed this specification in the presence of two subscribing witnesses.

HUDSON MAXIM.

Witnesses:
H. I. BERNHARD,
W. H. HARTING.